J. F. SHOEMAKER.
CHECK.
APPLICATION FILED MAY 3, 1916.

1,225,512.

Patented May 8, 1917.

Inventor
John F. Shoemaker
BY Oxury+Bair Attorneys

Witness
Will Freeman.

UNITED STATES PATENT OFFICE.

JOHN F. SHOEMAKER, OF DES MOINES, IOWA.

CHECK.

1,225,512.   Specification of Letters Patent.   Patented May 8, 1917.

Application filed May 3, 1916. Serial No. 95,266.

*To all whom it may concern:*

Be it known that I, JOHN F. SHOEMAKER, a citizen of the United States, and resident of Des Moines, in the county of Polk and State of Iowa, have invented a certain new and useful Check, of which the following is a specification.

My invention relates to bank checks, drafts and other written instruments representing financial transactions.

The object of my invention is to provide a bank check or the like of comparatively simple construction, so constructed and having such characters thereon as to afford a maximum protection to the maker of the instrument against raising the amount thereof.

A further object is to provide a combined check and stub so arranged as to afford maximum protection, and also maximum information to the maker of the check after the check has been detached.

Still a further object is to provide a bank check and stub provided with indicating characters so arranged that the check may be conveniently cut from the stub on such lines that both the check and the stub will, after the check has been severed, indicate the maximum amount for which the check has been drawn.

A further object is to provide such a check having columns of figures at the left end of the check and having a blank line for the name of the payee and the words "Pay to the order of", or their equivalent adjacent to said columns of figures and to said blank line and having indicating characters or a legend arranged on the face of the check adjacent to the columns of figures, and projecting into the body of the check above and below said words so that the check cannot be cut except with certain relation to the figures without leaving some legend or means indicating that the check is of a particular kind, and calling attention to the fact that it was not cut in such a way as to cause the figures to indicate the maximum amount for which the check was drawn.

Still a further object is to provide, in such a check, in connection with the foregoing features, a diagonal line printed or perforated or both, or indented, traversing the parts of the check which are to be filled in when the check is drawn.

My invention consists in the construction, arrangement and combination of the various parts of the device, whereby the objects contemplated are attained as hereinafter more fully set forth, pointed out in my claim and illustrated in the accompanying drawings, in which:

Figure 1 shows a plan view of my improved check with the stub attached thereto, and Fig. 2 shows a vertical, sectional, view taken on the line 2—2 of Fig. 1.

In the accompanying drawings, I have used the reference numeral 10 to indicate generally the body of my improved check to which is attached integrally a stub 11 preferably without any perforated line between them. A printed line 12 preferably scored, may be extended transversely across the body of the paper on the stub adjacent to the columns of figures hereinafter described.

The check 10 has the ordinary address and date line $12^a$, the ordinary line 13 to receive the name of the payee, the ordinary line 14 to receive the written amount of the check, the line 22 for the signature of the maker or drawer, and ordinary indicating characters 16 to indicate the person or institution on which the check is drawn.

At the left-hand end of the check body is a plurality of vertical spaced lines 17, between which arranged in columns, are indicating characters 18 arranged to show progressively increasing sums.

The columns of said characters or numbers are arranged between each pair of lines 17.

The numbers of each column are separated by indicating lines 19 which are preferably inclined from their rear ends adjacent to the stub forwardly and slightly downwardly, as clearly shown in the drawing.

The printed and depressed line 12 is preferably spaced to the left slightly from the left-hand vertical line 17.

On the upper part of the stub portion 11 is a plurality of inclined lines 20 on which the maker of the check may write the facts concerning a transaction performed with the check. On the lower part of the stub are the ordinary indicating characters and blank spaces for further recording the transaction.

Extending diagonally across the check body is a line of indicating characters 23 which intersect the lines 13, 14, and 22 and is printed and either depressed or perforated and contains some suitable warning, such for instance as "Not good for more than largest amount shown in figures on left margin, void if margin detached."

At the left end of the line 13 beginning immediately adjacent to the right-hand columns of figures 18 are the words "Pay to" or other equivalent. These words may be used in connection with the words "Order of" or the word "Bearer" or other words as may be desired.

Parallel lines 24 are arranged above and below the words "Pay to the order of" and extend from the right-hand line 17 toward the right for a short distance.

Inclined lines 24ª, printed, perforated or indented may be used extending from the right-hand ends of the respective lines 24 to the upper and lower ends respectively of the right-hand line 17.

Certain indicating words for example, "Protectu check" are printed, and preferably depressed or perforated on inclined lines between the right-hand ends of the lines 24 and the lower and upper ends respectively of the right-hand line 17, as clearly shown in Fig. 1.

In the given instance the word "Protectu" is the trade-mark of the company putting out checks like the subject of this application. That company has done extensive business, so that the words "Protectu check" have come to have a definite meaning to bankers and the like. Other words having the proper suggestion to the banker could be used. It will be seen that the words "Pay to" and the words "Protectu check" are so arranged that the check could not be cut on the right side of the right-hand line 17 or on said line without cutting some of said words, or leaving the words "Protectu check", thereby affording a suspicious appearance to catch the eye of the person handling the check, or leaving the words which indicate that the check is of a special type and has not been made in the proper way. That is to say, the features above described are such that the check cannot be severed from the stub without leaving the check in such condition as to put the cashier on guard.

It will be seen that the name of the payee, as well as the amount for which the check is drawn and the name of the maker are written through the warning line 23.

The check is designed to be used in connection with a suitable cutter, so that the left-hand part of the check may be cut on the lines 17 and 19, so that the maximum amount shown by the figures at the left-hand end of the check will indicate the maximum amount for which the check is drawn. In this connection it will be noted that the remaining figures or numbers arranged in the columns are left permanently attached to the stub, thereby affording a record for the owner of the check book.

The torn portion of the stub may be folded under on the line 12 affording access to the next check.

The warning line 23 is employed to warn and call attention to the fact that if the check has been severed on such line as to leave off all of the numbers 18, the check has not been properly drawn or has been tampered with. The warning line may be depressed or perforated, and printed, to prevent its removal. However, if only printed it would be very difficult to properly and cleanly remove the warning line on account of the fact that it is written through the lines 13 and 14 and 22. It will be seen that additional protection is afforded so that if the warning line should be entirely removed it would be impossible to cut the check on the right-hand side of the columns of figures without cutting through the words "Pay to" and the words "Protectu check" or without cutting through the main body of the check and leaving the check in such form as to indicate that the check has been mutilated.

The use of the columns of figures with the words "Protectu check" or some other suitable words is very important. The words "Protectu check" or some other suitable words may be depressed or perforated so that it is impossible to remove them.

It will be noted that in a check of this kind, having the columns of figures, it is necessary to make the check longer than the ordinary check or to shorten the stub. In this case the stub is shortened by inclining the lines 20, as shown, so that the stub will be shorter from left to right, than would otherwise be the case.

It thus occurs that the combined check and stub are no longer than in any other form thereof.

A check of this kind affords a maximum protection against being tampered with by raising the amount for which the check is drawn or otherwise.

In the first place a warning line and the words "Protectu check" or some equivalent thereof are readily visible to the cashier or other person receiving or handling the check and it would be difficult to remove the warning line, even if printed, for the reason that it would be necessary in order to remove the warning line, to remove a portion of the name of the payee, the amount for which the check is drawn and the name of the maker and to thereafter restore those portions.

If the warning line is not removed, then the maker of the check is protected against paying any larger amount than that shown by the columns of figures at the left-hand margin of the check. Even if the warning line is removed and the check is cut at the right of the columns of figures, the words "Protectu check" would remain and suggest that the check was of a particular type and had been mutilated after having been made.

It is impossible to cut the check on such a line as to omit the words "Protectu check" without cutting through the words "Pay to".

Attention is called to the fact that protection is secured and yet one cut only is necessary in severing the check. The check is simple and practical. The cashier may simply glance at the numbers on the left-hand margin to check the amount written in.

While I have described a check in illustrating my invention it should be understood that the protective feature may be used with other instruments such as drafts, notes, receipts, and the like, and it is my intention to cover such instruments when embodying my invention.

It may be understood that for the purpose of my invention the perforation of the warning line and the words "Protectu check" or any other words having the same function for suggesting to the mind of the person who handles the check that the check belongs to a particular type is for the purpose of preventing the removal of the warning line or the words "Protectu check" and the same purpose may be accomplished by indenting the warning line or the words "Protectu check". Thus, for my purpose perforation or indentation are equivalent constructions and it is my intention to use the words "perforation" or "perforated" in the following claim to cover the indentation of the characters or letters which accomplish exactly the same purpose as perforating them.

Some changes may be made in the construction and arrangement of the parts of my improved check without departing from its essential features and purposes, and it is my intention to cover by this application any such changes which may be included within the scope of my claim.

I claim as my invention:

A bank check having columns of figures arranged in progressively increasing amounts near the left-hand end of said check, a vertical line at the right side of each column, inclined lines arranged between the successive sums of each column, said check having a body portion on one side of said columns and a stub portion on the other side thereof, said body portion having blank lines to receive the name of the payee, the name of the maker and the amount for which the check is drawn, a warning line extended diagonally across said blank lines and having characters to indicate that the check is not good for more than the largest amount shown in the figures on the margin, said check having the words "Pay to the order of" or their equivalent arranged adjacent to said columns and adjacent to one end of the blank line for the name of the payee, and means for further indicating the peculiar nature of the check extending into the body of the check from said columns above and below said last mentioned words, whereby it is made necessary to sever the check body from the stub on lines having certain relations to said figures in order to use the check and whereby it is made impossible to raise the check.

Des Moines, Iowa, April 26, 1916.

JOHN F. SHOEMAKER.